United States Patent Office 3,462,414
Patented Aug. 19, 1969

3,462,414
POLYMERS OF CYTOSINE ARABINOSIDE
PHOSPHATES
William J. Wechter, Kalamazoo, Mich., assignor to The
Upjohn Company, Kalamazoo, Mich., a corporation of
Delaware
No Drawing. Filed Aug. 8, 1966, Ser. No. 570,763
Int. Cl. C07f 9/64
U.S. Cl. 260—211.5                    13 Claims

ABSTRACT OF THE DISCLOSURE

New polymeric cytosine arabinoside (Ca) phosphates possessing antiviral activity can be produced by condensing, with itself, partially protected and at least protected at the $N^4$-position, 1-$\beta$-D-arabinofuranosylcytosine phosphate (2', 3', or 5') in dry pyridine in the presence of dicyclohexylcarbodiimide, and removing thereafter the protective groups. From Ca 3'-phosphate polymers with 3'→5' phosphate bonds are obtained which can be linear or cyclic and which can be separated by column chromatography. From a Ca 2'-phosphate starting material polymers with 2'→5' phosphate bonds and from a 5'-phosphate, polymers with mixed bonds 5'→3', 5'→2', and 5'→5' are obtainable, which can be cyclic or linear.

These compounds can be used for cleansing glassware and instruments, used in the growing of tissue cultures for virus, and for keeping antibiotic-producing streptomyces cultures phage-free.

---

The present invention is concerned wtih novel compounds and more particularly oligonucleotides and cyclic oligonucleotides consisting of units of 1-$\beta$-D-arabinofuranosylcytosine (ara-cytidine), and a process for the production thereof.

The novel compounds of this invention can be illustratively represented by the following short formulae [cf. H. G. Khorana et al., J. Am. Chem. Soc. 83, 675 (1961)]:

(I)   $(Cap)_n Cap$            (Ia)   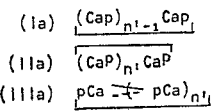
(II)  $(CaP)_n CaP$            (IIa)
(III) 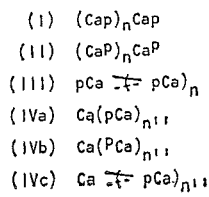     (IIIa)
(IVa) $Ca(pCa)_{n''}$
(IVb) $Ca(Pca)_{n''}$
(IVc)

wherein Ca is 1-$\beta$-D-arabinofuranosylcytosine (ara-cytidine) of the formula:

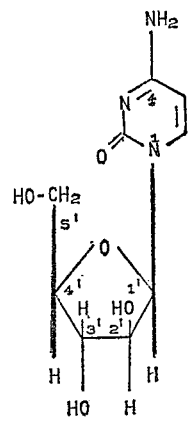

p is a phosphoric acid radical which can connect two ara-cytidine units and which by its position in the short formula indicates the mode of linkage in the ara-cytidine phosphate polymer molecule; namely, the "p" before the Ca [pCa], indicates the point of esterification is on the 5'-carbon atom; the "p" following Ca and on the same line with Ca [Cap], means the phosphate radical is on the 3'-carbon atom attached; and the "p" following Ca but above the line [Ca$^p$] signifies that the phosphate group is attached to the 2'-carbon atom. The brackets ⌊_____⌋ indicate a cyclic oligonucleotide and at the same time the two points of attachment (indicated by the end positions of the vertical lines of the bracket). The parameter $n$ represents a number from 1 to 8, inclusive; $n'$ a number from 1 to 4, inclusive; $n''$ a number 2 to 8, inclusive. Thus, for $n=2$, the Formula I becomes CapCapCap which indicates the phosphoric acid units are connected in a 3'→5'→3'→5'→3' manner, since "p" after the first Ca means 3'-attachment and prior to second Ca means 5'-attachment.

In the Formula Ia, the same arrangement exists except that the terminal phosphate group, which is in the 3'-position to the terminal Ca group is connected as illustrated by the bracket leading to the front position (5') of the first Ca unit. Thus, the formulae for (I) and (Ia) completely drawn for $n=2$ are:

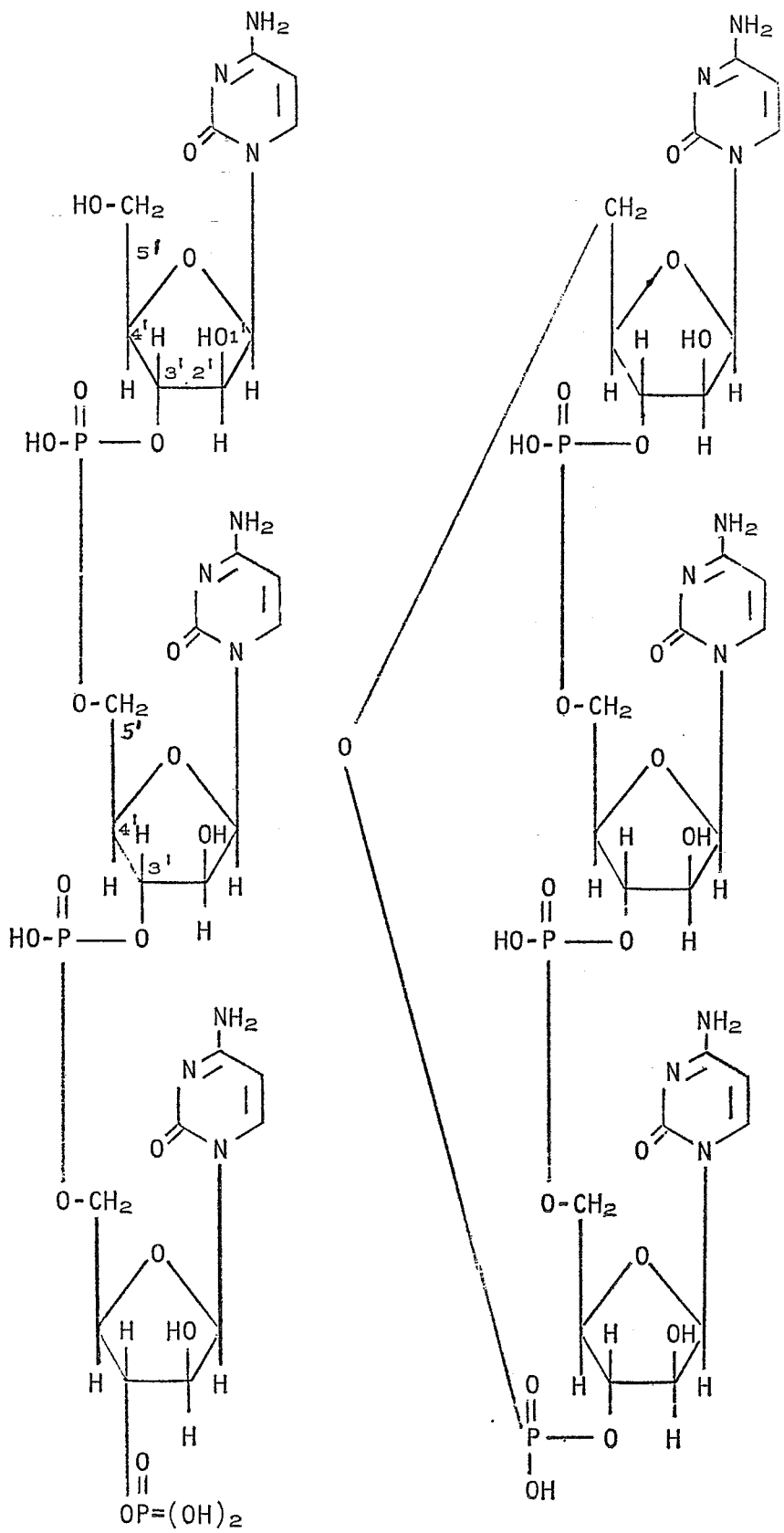
(1) for n=2
CapCapCap
(1a) for n'=3
CapCapCap

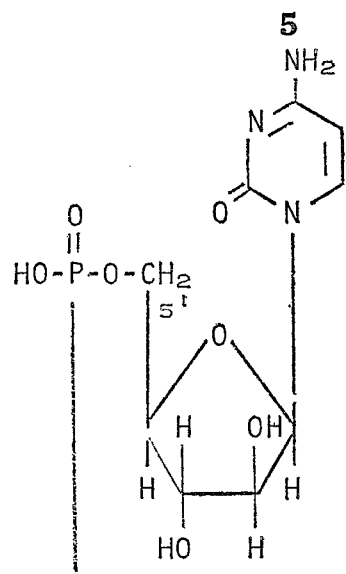
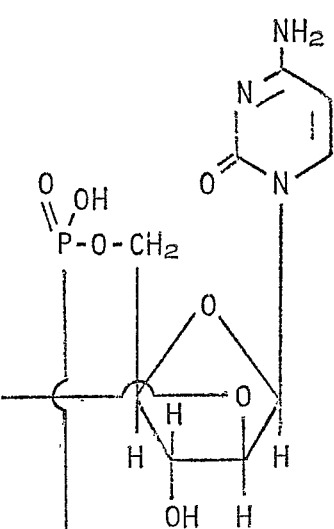
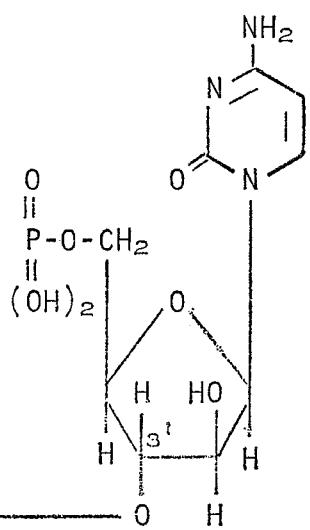
(III) when n = 2
pCapCaPCa
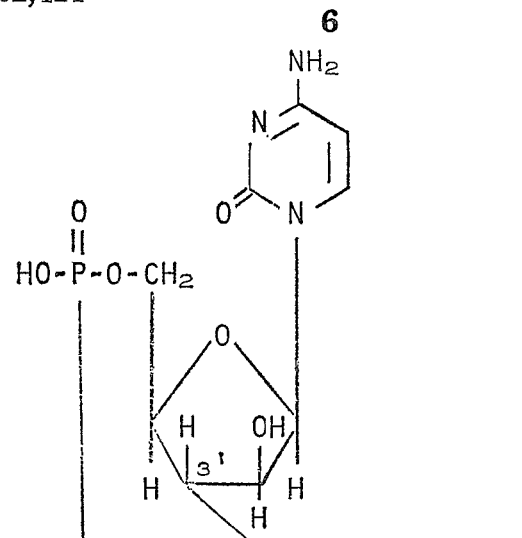
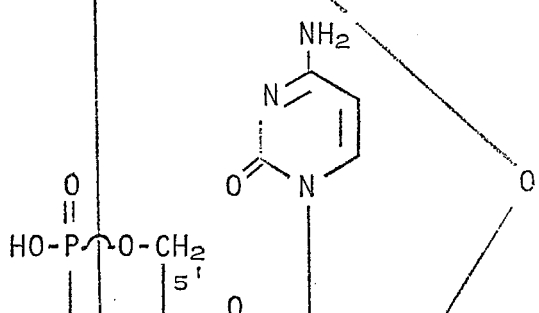
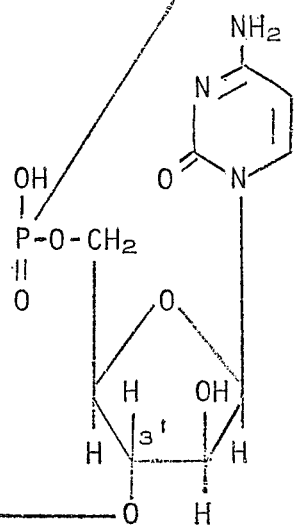
(IIIa) when n = 2
pCapCaPCa, The Formulae II and IIa are analogous to I and Ia and differ only by the fact that the linkages now are 2′→5′ instead of 3′→5′ as in I and Ia.

In the Formulae III and IIIa the first Ca unit is connected to the phosphate group in the 5′-position ("p" before Ca). This phospate group connects to a 2′ or 3′-position of the next Ca unit indicated by a lower dashed line for the 3′-connection and a solid upper line for the 2′-connection. The second Ca also has a 5′-phosphate group with which it connects to either 2′- or 3′- of the third Ca group. Thus, the linkages are 5′→3′ or 2′ and so on with 5′→3′ the predominant linkage (60 to 80%). The terminal 5′-phosphate group can be attached to the 2′ or 3′-position of the first Ca unit to form the ring structure IIIa. When $n=2$ and the linkage between the first two Ca units is 5′→2′ and the one between the middle and terminal Ca units is 5′→3′, the thus formed trinucleotides III, and [(IIIa) when the third Ca units are connected by a 5′→3′ bond], can be represented as above.

Finally the products IVa, IVb and IVc are analogous to I, II and III but lack the terminal phosphate group.

In the following, the abbreviated formulae, defined and exemplified above, will be frequently employed.

The process for the present invention consists of: polymerizing a $N^4$-protected 1-β-D-arabinofuranosylcytosine 2′-, 3′- or 5′-phopshate by reacting with a selected condensing agent (carbodiimides, aromatic sulfonyl chlorides and the like), particularly dicyclohexylcarbodiimide; and removing by hydrolysis usually with anhydrous ammoniacal methanol, the protective group on $N^4$. The resulting products are obtained as a mixture and are generally separated by chromatographic procedures.

Type I and Ia compounds are obtained when the starting material was $N^4$-benzoyl-1-β-D-arabinfuransoylcytosine 3′-phosphate. If the phosphate was a 2′-phosphate, the compounds of Formulae II and IIa are obtained; and if the compounds were 5′-phosphate, the products of Formulae III and IIIa are obtained. In order to obtain the compounds of Formulae IVa, IVb and IVc, the compounds of Formula I, II or III are treated with bacterial alkaline phosphatase as shown in the examples. The bacterial alkaline phosphatase hydrolyzes only mono-esterified phosphate groups.

The new oligonucleotides and the cyclic oligonucleotides corresponding to Formulae I, Ia, II, IIa, III, IIIa, IVa, IVb and IVc exhibit significant cytotoxic activity in vitro, particularly against viruses, specifically the different types of Herpes, Coe, and Vaccinia viruses. Externally these compounds can be used for cleansing glassware and instruments used in the growing of tissue cultures for virus. The antiviral activity can also be used to prepare cultures of microorganisms, free of viral phages, for example, phage-free antibiotic-producing Streptomyces cultures.

The starting compounds, $N^4$-protected 1-β-D-arabinofuranosylcytosine 2′-phosphate, 3′-phosphate or 5′-phosphate are produced as shown in the subsequent preparations.

The following preparations and examples are illustrative of the process and products of the present invention, but are not to be construed as limiting.

In the subsequent syntheses various exchange resins (Dow chemical) are utilized which can be described as follows:

DOWEX 50X8

Dowex 50×8 is a strongly acidic cation exchange resin composed of nuclear sulfonic acid exchange groups attached to a styrene polymer lattice cross-linked with approximately 8% divinylbenzene.

DOWEX 50WX8

Dowex 50WX8 is a specially purified form of Dowex 50X8 in which the resin has a white (W) color rather than the yellow-brown color of Dowex 50×8.

DOWEX 1X8

Dowex 1X8 is a strongly basic anion exchange resin of quaternary ammonium exchange groups attached to a styrene polymer lattice.

DOWEX AG 1X8

Dowex AG 1X8 is a specially purified and sized form of Dowex 1X8, is supplied by Bio-Rod Laboratories, Richmond, Calif.

PREPARATION 1

*1-(5′-O-triphenylmethyl-β-D-arabinofuranosyl)cytosine*

To a solution of 10 g. of 1-β-D-arabinofuranosylcytosine hydrochloride in 200 ml. of pyridine was added 12 g. of triphenylchloromethane. The reaction mixture was thereupon stirred at room temperature (23–26° C.) for 1 week. The reaction mixture was then poured with stirring into 3 l. of ice water, whereupon 1-(5′-O-triphenylmethyl-β-D-arabinofuranosyl)cytosine separated as an oil. The oil crystallized on standing with water overnight, and the crystals were recovered by filtration, then broken up, washed thoroughly with water and air-dried until constant weight was obtained. The thus-obtained solids were triturated with 200 ml. of boiling heptane and, after having been dried, were transferred into 1 l. of boiling acetone containing 1 g. of active charcoal (Darco G–60). The hot suspension was filtered to remove the charcoal and the filtrate was distilled on a steam bath to a volume of about 75 ml. which was allowed to cool to room temperature, thereby giving a crystalline product. The crystalline product was collected on a sintered glass funnel and washed with one 25-ml. portion of ice-cold acetone. The product was thereupon dried giving 13 g. of 1-(5′-O-triphenylmethyl-β-D-arabinofuranosyl)cytosine of melting point 227.5–228° C. with decomposition.

PREPARATION 2

*$N^4$-benzoyl-1-(5′-O-triphenylmethyl-β-D-arabinobinofuranosyl)cytosine*

A mixture of 5.0 g. (10.3 mmoles) of 1-(5′-O-triphenylmethyl-β-D-arabinofuranosyl)cytosine, 35 ml. of dry pyridine, and 5 ml. of benzoyl chloride was stirred at room temperature (24–26° C.) for about 20 hours. The thus-obtained reaction mixture was then poured into 400 ml. of cold water and stirred at room temperature for 18 hours. The aqueous portion was then decanted and the residual gummy material was washed twice with water by decantation. The gum and solids were dissolved in 300 ml. of methylene chloride and this solution was washed twice with 50-ml. portions of water and twice with 50 ml. of a saturated aqueous sodium chloride solution. The methylene chloride solution was then dried by passing it through 10 g. of anhydrous sodium sulfate and the filtrate was then evaporated to dryness under reduced pressure. The thus-obtained residue was taken up in 400 ml. of absolute methanol and 200 ml. of dry tetrahydrofuran. The thus-obtained solution was chilled to 0° C. with ice. The cold solution was then treated with 10 ml. of 25% sodium methoxide in methanol. After 30 minutes at 0° C., 110 ml. of Dowex 50WX8 (pyridinium) resin was added whereupon the pH of the solution dropped to about 7. The thus-obtained suspension was filtered to be free of resin, the resin was washed with 250 ml. portions of methanol and the combined washings and filtrate was taken to dryness at 30° C. under reduced pressure. The resulting residue was dissolved in a small amount of benzene, the benzene solution was absorbed onto a column of silica gel (58 by 4.8 cm.) having a column volume of 1 l. This column was eluted with twenty 100-ml. portions of 2% methanol in benzene solution followed by forty 100-ml. portions of 5% methanol in benzene solution. Fractions 31–41 as ascertained by thin layer chromatography contained the product. These fractions were combined, acetone was added and the mixture was crystallized as microclusters by adding Skellysolve B hexanes.

This material was crystallized from acetone-Skellysolve B hexanes to give pure $N^4$-benzoyl-1-(5'-O-triphenylmethyl-β-D-arabinofuranosyl)cytosine of melting point 210.5–211.5° C.

*Analysis.*—Calcd. for $C_{35}H_{31}O_6N_3$: C, 71.90; H, 5.32; N, 7.19. Found: C, 71.41; H, 5.59; N, 7.46.

PREPARATION 3

$N^4$ - benzoyl - 1-(5'-O-triphenylmethyl-β-D-arabinofuranosyl)cytosine 2'-phosphate and $N^4$-benzoyl-1-(5'-O-triphenylmethyl - β-D-arabinofuranosyl)cytosine 3'-phosphate A solution of 590 mg. of $N^4$-benzoyl-1-(5'-O-triphenylmethyl-β-D-arabinofuranosyl)cytosine in 10 ml. of pyridine containing 1.5 ml. of M 2-cyanoethyl phosphate (1.5 mmoles) was evaporated in vacuo at 40° C. Evaporation with pyridine was repeated twice after which the residue was taken up in 5 ml. of purified pyridine and 600 mg. of dicyclohexylcarbodiimide was added, and the solution shaken at room temperature in the dark for 2 days. To this reaction mixture was added 5 ml. of water, and the solution was then stirred at room temperature for 2 to 3 hours. The insoluble solid was filtered and washed with 1.2 ml. of pyridine and the combined filtrate washed twice with Skellysolve B hexanes. The Skellysolve B hexanes were removed under reduced pressure and the residual pyridine solution chilled to ice temperature. This solution was then treated with 6.5 ml. of 2 N aqueous sodium hydroxide for 20 minutes at low temperature (about 0° C.). The reaction was terminated by the addition of 15 ml. of pyridinium Dowex 50WX8 resin. The resin-free solution and three 5 ml. washes of 50% aqueous pyridine were combined and then taken to dryness at 40° C. under reduced pressure. The thus-obtained crude materials, a mixture containing both the 2'- and the 3'-phosphate of $N^4$-benzoyl-1(5'-O-triphenylmethyl-β-D-arabinofuranosyl)cytosine, was not separated for the next step.

PREPARATION 4

$N^4$ - benzoyl-1-β-D-arabinofuranosylcytosine 2'-phosphate phate and $N^4$-benzoyl-1-β-D-arabinofuranosylcytosine 3'-phosphate The total amount of product of Preparation 3, consisting of $N^4$-benzoyl-1(5'-O-triphenylmethyl-β-D-arabinosyl)cytosine 2'- and 3'-phosphates, was taken up with 30 ml. of 80% aqueous acetic acid and this reaction mixture was allowed to stand at room temperature for 56 hours. The aqueous acetic acid was then removed at 40° C. in vacuo and the dry residue suspended in 100 ml. of water, and filtered free of trityl alcohol. The filtrate was taken to dryness in vacuo, giving a light yellow gum-like material which upon thin-layer chromatography indicated two major products: $N^4$-benzoyl-1-β-D-arabinofuranosylcytosine 2'-phosphate and 3'-phosphate. This residue was thereupon taken up in 3 ml. of saturated anhydrous ammoniacal methanol and the resulting solution was allowed to stand for 18 hours at room temperature 22–25° C.). The solvent and ammonia were then removed under reduced pressure and the resulting residue taken up in a small volume of water and chromatographed on a column of dimensions 2.8 by 24 cm., charged with Dowex AG 1X8 (formate) ion exchange resin, eluted first with 2 l. of 0.01 molar formic acid, following by 5 l. of 0.02 molar formic acid, and collecting 20 ml. fractions. The fractions containing the 2'-phosphate came off first as determined by the NMR spectrum and expected retention of the product. These fractions were combined, freeze-dried and recrystallized from water to give 1-β-D-arabinofuranosylcytosine 2'-phosphate $\lambda_{max}^{pH5}$ 274 mμ. In the later fractions, the 1-β-D-arabinofuranosylcytosine 3'-phosphate was obtained.

The thus-obtained 1-β-D-arabinofuranosylcytosine 2'-phosphate (and separately 1-β-D-arabinofuranosylcytosine 3'-phosphate), in pyridine solution, was treated with benzoyl chloride for 24 hours at room temperature. The reaction mixture was poured into cold water and stirred at room temperature for 18 hours. The solid residues thus obtained were collected, washed repeatedly with water and without further purification saponified with 2 N aqueous-ethanolic sodium hydroxide at 0° C. for 20 minutes. The reaction mixture was then quickly acidified, the solids collected on filter and washed repeatedly with water. The material thus obtained was recrystallized from methylene chloride to give $N^4$-benzoyl-1-β-D-arabinofuranosylcytosine 2'-phosphate (and $N^4$-benzoyl-β-D-arabinofuranosylcytosine 3'-phosphate from the 3'-phosphate starting material).

PREPARATION 5

$N^4$-benzoyl-1-(2',3'-di-O-benzoyl-β-D-arabinofuranosyl)cytosine

A mixture of 6.2 g. of 1 - (5'-O-triphenylmethyl-β-arabinofuranosyl)cytosine, 40 ml. of dry pyridine, and and 6 ml. of benzoyl chloride was stirred at room temperature (24–26° C.) for about 20 hours. The thus-obtained reaction mixture was then poured into 500 ml. of cold water and stirred at room temperature for 3 hours. The aqueous portion was then decanted and the residual gummy material was washed twice with water by decantation. The gum and solids were dissolved in 150 ml. of methylene chloride and this solution was extracted consecutively twice with 50-ml. portions of water and once with 50 ml. of a saturated aqueous sodium chloride solution. The methylene chloride solution was then dried by passing it through 10 g. of anhydrous sodium sulfate, supported on a sintered glass funnel. The drying agent was then washed with 20 ml. of methylene chloride and the washing combined with the filtrate. The methylene chloride solution was thereupon evaporated at 40° C. in vacuo. The thus-obtained residue was dissolved in 50 ml. of chloroform and treated with stirring with 6.7 ml. of hydrogen bromide in acetic acid solution (30% hydrogen bromide). After 3 minutes, the reaction mixture was distilled to a volume of about 10 ml. at 40° C. in vacuo to give a concentrate. This concentrate was diluted with 10 ml. of ordinary chloroform and added to a chromatographic column made up with 100 g. of silica gel (180 ml. volume). The silica gel employed was Brinkman silicic acid for chromatography employing hydrocarbon stabilized chloroform. The column was thereupon eluted with 3 column volumes (540 ml.) of ethanol stabilized chloroform at a flow rate of about 3.5 ml. per minute. The effluent from this procedure was discarded. The column was thereupon eluted with 1.2 l. of ethanol stabilized with chloroform to which 3% by volume of methanol has been added at a flow rate of 3.5 ml. per minute. The effluent from this operation was collected in 20 ml. fractions. Each fraction was examined for triphenylcarbinol or triphenylmethyl ether by placing a drop of each fraction on a sheet of chromatographic paper (Whatman No. 40) and examining the spot for ultraviolet absorption followed by spraying the paper with 50% aqueous sulfuric acid. Based on the result of this chromatographic determination, fractions 25–43 were combined, washed with 200 ml. of water containing 0.5 ml. of pyridine, dried with anhydrous sodium sulfate, and evaporated in vacuo to give a residue. This residue was recrystallized by dissolving it in ethyl acetate and adding Skellysolve B hexanes until crystallization started whereupon the vessel was refrigerated to 4° C. Three crops of crystals were collected which were all homogeneous as determined by thin-layer chromatography using silica gel, 10% methanol and 90% benzene. The total yield in three crops was 1.45 g., 0.94 g. and 0.740 g., a total of 3.13 g. (44%) of $N^4$ - benzoyl - 1 - (2',3'-di-O-benzoyl-β-D-arabinofuranosyl)cytosine of melting point 177.5 to 178° C.

*Analysis.*—Calcd. for $C_{30}H_{25}N_3O_8$: C, 64.90; H, 4.50; N, 7.57. Found: C, 63.95; H, 4.67; N, 7.29.

PREPARATION 6

$N^4$-benzoyl-1-$\beta$-D-arabinofuranosylcytosine 5'-phosphate

A solution was prepared containing 50 mmoles of pyridinium-2-cyanoethylphosphate, dissolved in 10 ml. of dry pyridine, and thereto was added 2.77 g. of $N^4$-benzoyl-1-(2',3'-di-O-benzoyl - $\beta$ - D - arabinofuranosyl) cytosine whereupon the solution was taken to dryness. The mixture was then dissolved in 25 ml. of pyridine, 3.09 g. (150 mmoles) of dicyclohexylcarbodiimide was added

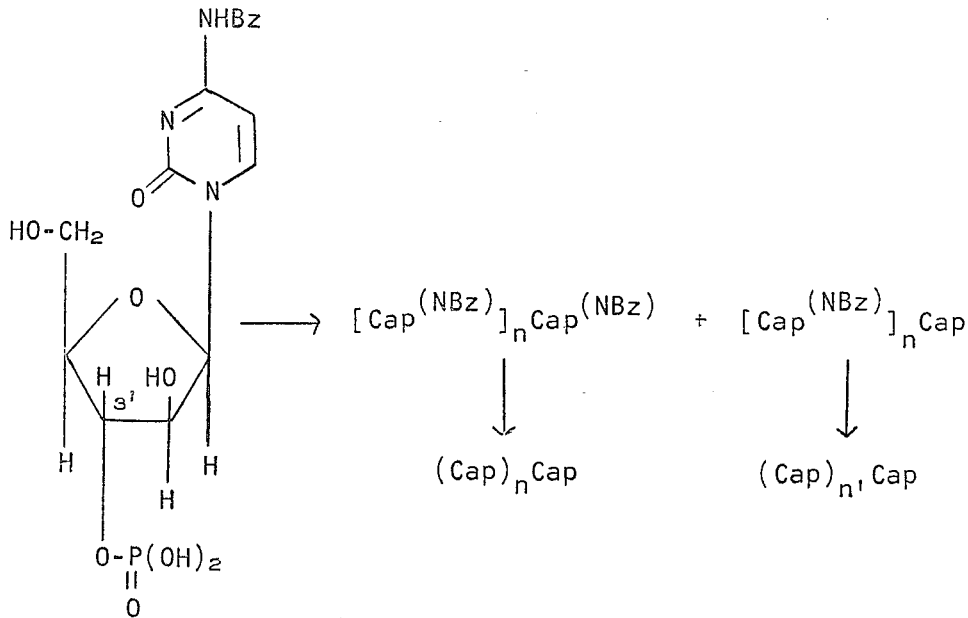

and the mixture shaken at room temperature for 5½ days. About 15 ml. of water was then added and the mixture extracted twice with Skellysolve B hexanes and filtered free of the insoluble urea compound. The solution was then diluted to 40 ml. with pyridine, chilled to about 0° C. with ice and made about 1 N in sodium hydroxide by the addition of 40 ml. of ice cold 2 N sodium hydroxide solution. The reaction was terminated after 20 minutes by adding an excess of pyridinium-Dowex 50X8 resin. The resin was separated by filtration, washed with water and the aqueous washing and filtrate were evaporated under reduced pressure to about 25 ml. following the addition of 200 mg. of ammonium bicarbonate. The precipitates in the 25 ml. of solution were removed by filtration. The filtrate was evaporated under reduced pressure and the residue taken up in a solvent system composed of 1 M ammonium acetate (pH 6) and isopropyl alcohol in a 2:5 ratio, then absorbed onto a cellulose column having a column volume of 1850 ml. made up with the same system. The column was then eluted with a solvent mixture consisting of a one molar aqueous ammonium acetate solution and isopropyl alcohol (2:5), the first 600 ml. of eluate was discarded. Then, fractions of 20 ml. each were collected (325 fractions total). Fractions 55–110, when combined, contained approximately 90% of theory of the total amount of $N^4$-benzoyl-1-$\beta$-arabinofuranosylcytosine 5'-phosphate. These fractions were evaporated to a small volume in the presence of 10 ml. of pyridine, the residue was diluted with water to a volume of 50 ml. and the product absorbed on a column charged with pyridinium-Dowex 50WX8. The column was then eluted with 3 l. of deionized water. The total effluent was concentrated under reduced pressure and rediluted with 1% aqueous pyridine four times, followed by concentration. Finally, the residue was taken up in dilute aqueous pyridine and lyophilized twice from this solvent to give a white solid of $N^4$-benzoyl-1-$\beta$-D-arabinofuranosylcytosine 5'-phosphate in a yield of 1.81 g. (70%)

*Analysis.*—Calcd. for $C_{16}H_{18}N_3O_8P \cdot H_2O \cdot$ pyridine: P, 5.95. Found: P, 6.06.

Heating this solvate to 100° C. in vacuo (15 mm. Hg) for 72 hours gave $N^4$-benzoyl-1-$\beta$-D-arabinofuranosylcytosine 5'-phosphate.

EXAMPLE 1

*Polymers of $N^4$ - benzoyl - 1 - $\beta$ - D - arabinofuranosylcytosine 3'-phosphate and conversion to polymers of 1-$\beta$-D-arabinofuranosylcytosine 3' - phosphate and triethylamine salts thereof*

A solution of $N^4$-benzoyl-1-$\beta$-D-arabinofuranosylcytosine 3'-phosphate (1 mmole), dissolved in pyridine containing small amounts of water, was taken to dryness several times with anhydrous purified pyridine at reduced pressure. The resulting residual gum from this drying prodcedure was taken up in 0.5 ml. of purified pyridine and thereto was added 520 mg. of dicyclohexylcarbodiimide in 0.5 ml. of pyridine. The suspension which resulted, was shaken vigorously for 5 minutes and the flask containing the reaction mixture was stored at room temperature for 6 days protecting it from light. After this period, the reaction was terminated by the addition of 15 ml. of 50% aqueous pyridine, and the suspension stirred overnight. The insoluble dicyclohexylurea was filtered and unreacted dicyclohexyldicarbodiimide was extracted into ether and the aqueous pyridine solution was taken to dryness at 30° C. in vacuo.

The thus-obtained residue was further dried by evaporating it with anhydrous pyridine and the resulting product was taken up with 10 ml. of anhydrous pyridine, 2.5 ml. of acetic anhydride and 0.68 ml. of tri-(n-butyl) amine. The solution was shaken for 3 days in the dark at room temperature (about 24° C.), cold water was then added until the solution became turbid and the mixture was stirred at room temperature for a period of 20 hours. Thereafter, 10 ml. of pyridine was added and the solution again taken to dryness at 30° C. under reduced pressure. The dried material was evaporated with dilute aqueous pyridine six times to rid the residue of pyridinium acetate. The resulting gum was then taken up in 50 ml. of concentrated anhydrous ammoniacal methanol and refrigerated at 40° C. for 70 hours. The solvent and ammonia was removed from the reaction mixture under reduced pressure and the benzamide, which resulted, extracted by trituration with ether. The residue was thereupon suspended in 0.02 M triethylamine bicarbonate (pH 7.5), filtered free of insoluble material and absorbed onto a column of DEAE-cellulose (carbonate form) (DEAE is diethylaminoethyl). The dimensions of the column were 3.8 x 30 cm. The column was eluted with a salt gradient employing a solution consisting of 8 l. of 0.02 M triethylamine bicarbonate (pH 7.5) and 8 l. of aqueous 0.50 M sodium chloride solution. The fractions taken were 20 ml. each. The column was monitored at 270 mμ with a Vanguard ultraviolet monitor (Type 10560D). The different polymers were recovered in the order of their molecular weight, namely, the unreacted mononucleotide as triethylamine salt was recovered first, then the di-, trinucleotides and so on as bis-triethylamine salts, tris-triethylamine salt, etc. The cyclic polymers appeared before the straight-chain polymers, except for the cyclic monomer, ara-cytidine 3′,5′-cyclic phosphate triethylamine salt.

From these salts the free product was obtained by adding an excess of Dowex 1X8 (formate form) resin, filtering and eluting the remaining resin with molar formic acid. The thus-obtained aqueous formic acid solution is lyophilized, whereby the free acid is obtained as a white powder.

In this manner di-, tri-, tetra-, penta-, hexa-, hepta-, octanusleotides as polytriethylamine salts are produced and collected such as:

CapCap [(C$_2$H$_5$)$_3$N]$_2$ $\lambda^{pH4}_{max.}$ 271 mμ (210 OD units)

CapCap [(C$_2$H$_5$)$_3$N]$_2$ $\lambda^{pH4}_{max.}$ 271 mμ (45 OD units)

CapCapCap tris(triethylamine) salt

CapCapCap tris(triethylamine) salt

CapCapCapCap tetra(triethylamine) salt

CapCapCapCap tetra(triethylamine) salt and the like polytriethylamine salts corresponding to the formulae (1) and (la). These salts, as mentioned before, by treatment with an excess of Dowex 1X8 (formate form) resin or the like, are converted to the free oligonucleotides.

EXAMPLE 2

*Polymers of 1-β-D-arabinofuranosylcytosine 2′-phosphate (ara-cytidine 2′-phosphate polymers)*

In the manner given in Example 1, 1-β-D-arabinofuranosylcytosine 2′-phosphate was treated with dicyclohexylcarbodiimide and subsequently with tri-(n-butyl)amine and acetic anhydride, then with ammoniacal methanol and extracted with triethylamine bicarbonate to give the polymers of ara-cytidine 2′-phosphate in the form of their triethylamine salts and as represented by Formulae I and IIa. Treating of the triethylamine salt with Dowex 1X8 (formate form) resin as in Example 1, gave the free acid, ara-cytosine (2′→5′-phosphate polymers and cyclic polymers).

EXAMPLE 3

*Polymers of ara-cytidine 5′-phosphate*

In the manner given in Example 1, N$^4$-benzoylaracytidine 5′-phosphate was polymerized with dicyclohexylcarbodiimide, treated with tri(n-butyl)amine and acetic anhydride, then with ammoniacal methanol and finally extracted with triethylamine bicarbonate to give the compounds of Formulae III and IIIa in the form of triethylamine salts.

Treating the triethyamine salts of Formulae III and IIIa with Dowex 1X8 (formate form) resin as in Example 1, produces the free nucleotides.

EXAMPLE 4

*Degradation of CapCap with bacterial alkaline phosphatase to CapCa*

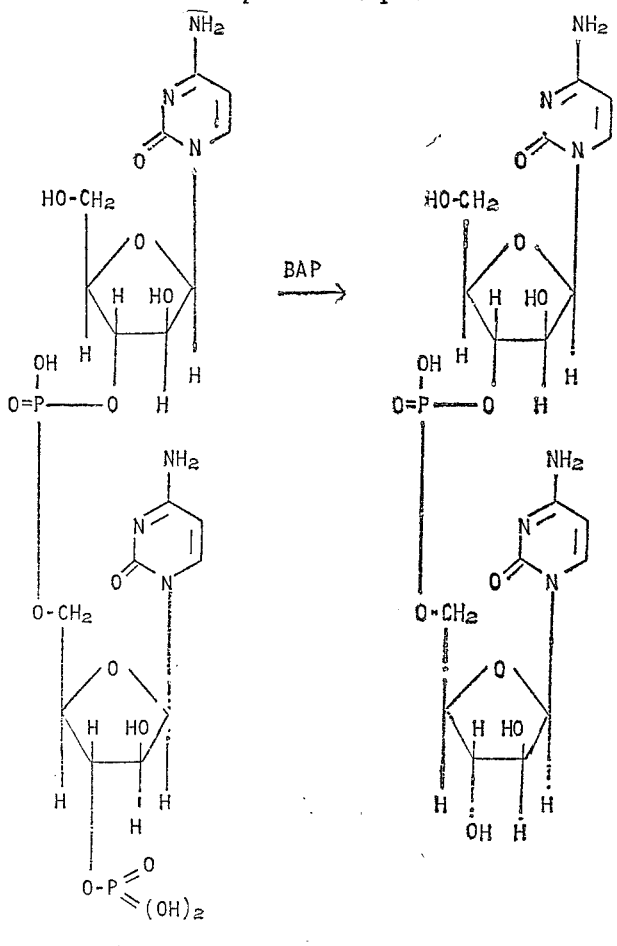

Twelve OD units (272 mμ) of ara-cytidine [3'→5'] ara-cytidine 3'-phosphate in 0.10 ml. of water was treated with 0.02 ml. bacterial alkaline phosphatase (Worthington Biochemicals, 10:1 diluted with distilled water) in 0.02 ml. of M tris buffer (hydroxymethyl)aminomethane hydrochloride of pH 9.0, at 37° C. for a period of 2 hours. The total solution was then streaked onto a 15 cm. wide sheet of paper (Whatman 3MM) and developed by paper chromatography overnight with a solvent mixture of isopropyl alcohol:concentrated ammonium hydroxide:water in a ratio of 7:1:2. A single ultraviolet product Rf 0.31 was found by scanning of the dried sheet with ultraviolet light. This product was ara-cytidine [3'→5'] ara-cytidine (CapCa) ammonium salt which was extracted into 3.0 ml. of water giving a solution of λ max. 272 mμ containing 7.6 OD units.

In the manner given in Example 4, other products of Examples 1, 2, and 3 can be dephosphorolated as to their terminal phosphate group with bacterial alkaline phosphatase to give the compounds of Formulae IVa, IVb and IVc.

I claim:
1. A compound selected from the group consisting of:

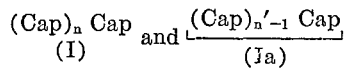

wherein Ca is 1-β-D-arabinofuranosylcytosine, p is a phosphoric acid radical connecting the arabinofuranosylcytosine units in position 3'→5' in alternate manner, $n$ is a number from 1 to 8, inclusive, and $n'$ is a number from 1 to 4, inclusive, and the bracket |_____| signifies a cyclic nucleoside 3'5'-phosphate.

2. The triethylamine salts of the compounds of claim 1.

3. The compound represented by the formula:

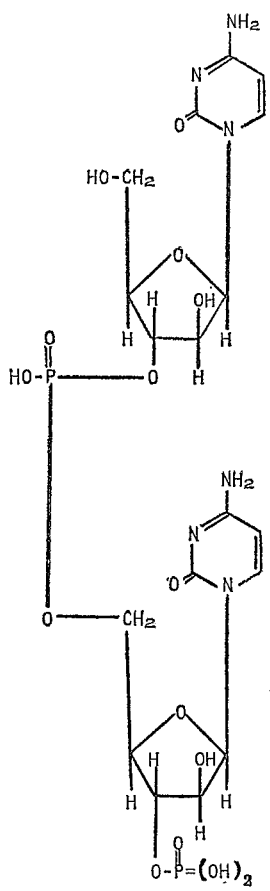

4. The compound represented by the configurational formula:

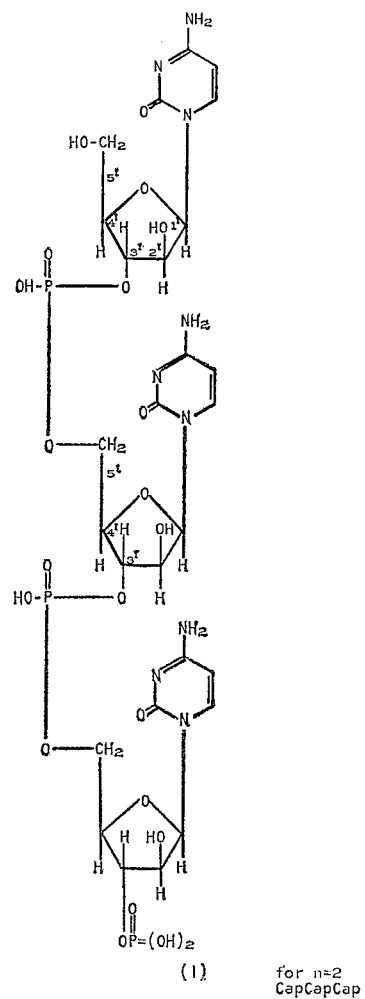

5. The compound represented by the configurational formula:

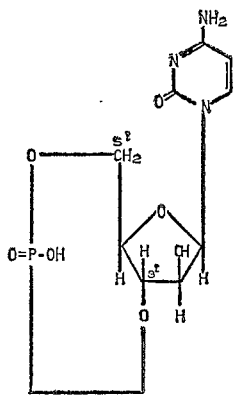

6. The compound represented by the configurational formula:

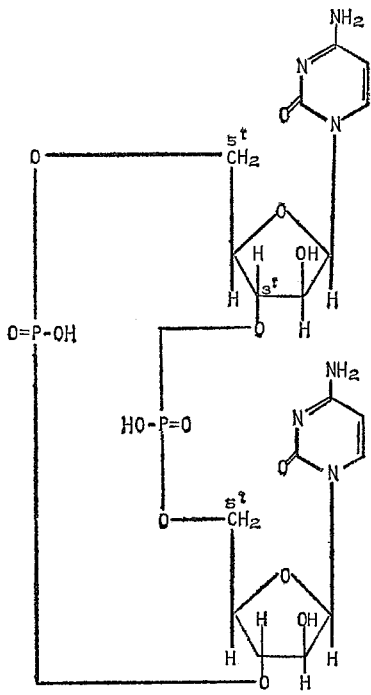

7. The compound represented by the configurational formula:

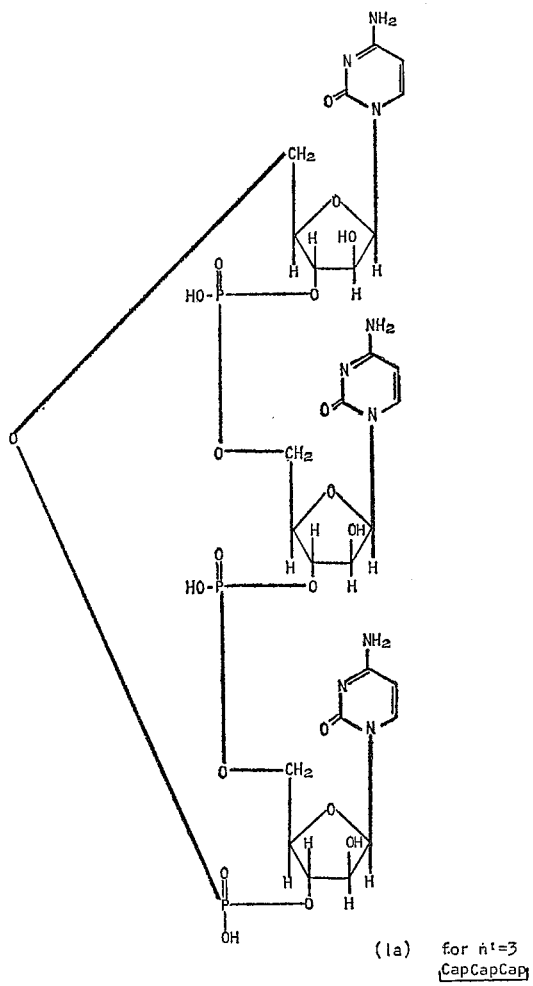

(Ia) for n'=3
CapCapCap

8. A compound selected from the group consisting of:

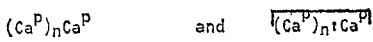

wherein Ca is 1-β-D-arabinofuranosylcytosine, p is a phosphoric acid radical connecting the arabinofuranosylcytosine units in positions 2'→5' in alternate manner, n is a number from 1 to 8, inclusive, and n' is a number from 1 to 4, inclusive, and the bracket ⎡⎤ signifies a cyclic nucleoside 2'5'-phosphate.

9. The triethylamine salts of the compounds of claim 8.

10. A compound selected from the group consisting of:

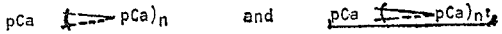

wherein Ca is 1-β-D-arabinofuranosylcytosine, p is a phosphoric acid radical connecting the arabinofuranosylcytosine units in positions 5'→3' or 5'→2' in alternate manner, n is a number from 1 to 8, inclusive, and n' is a number from 1 to 4, inclusive, and the bracket |⎯⎯| signifies a cyclic nucleoside 5',3'- or 5'2'-phosphate.

11. The triethylamine salts of the compounds of claim 10.

12. A compound selected from the group consisting of:

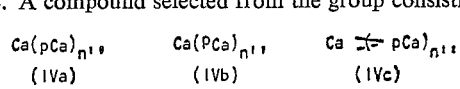

wherein Ca is 1-β-D-arabinofuranosylcytosine, p is a phosphoric acid radical connecting the arabinofuranosylcytosine units and indicating by its position in the above formulae the mode of linkage, and n'' is a number from 2 to 8, inclusive.

13. The compound represented by the configurational formula:

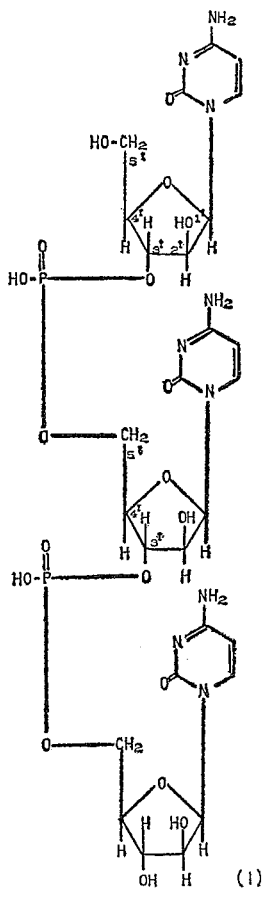

(I) for n''=2
CapCapCa (References on following page)

References Cited

UNITED STATES PATENTS 3,300,478  1/1967  Wechter ---------- 260—211.5
3,321,463  5/1967  Moffatt ---------- 260—211.5

LEWIS GOTTS, Primary Examiner
JOHNNIE R. BROWN, Assistant Examiner

U.S. Cl. X.R.

21—58; 195—28; 260—999

UNITED STATES PATENT OFFICE
CERTIFICATE OF CORRECTION

Patent No. 3,462,414                                          August 19, 1969

William J. Wechter

It is certified that error appears in the above identified patent and that said Letters Patent are hereby corrected as shown below:

Column 3, bottom, for "(1) for n=2" should read -- (I) for n=2 --. Column 4, bottom, for "(1a) for n'=3" should read -- (Ia) for n'=3 --. Column 7, line 18, "third Ca" should read -- third and first Ca --; line 26, "phopshat" should read -- phosphate --. Column 8, line 8, "is supplied" should read -- supplied --. Column 9, line 1, "was crystallized" should read -- was recrystallized --; lines 42 and 43, "phosphate phate" should read -- phosphate --. Column 10, line 12, "benzoyl-β-D-" should read -- benzoyl-1-β-D- --. Column 12, line 9, "3'-phosphate" should read -- 3-phosphate --. Column 13, line 21, "octanusleotides" should read -- octanucleotides --.

Signed and sealed this 26th day of January 1971.

(SEAL)
Attest:

EDWARD M. FLETCHER, JR.                          WILLIAM E. SCHUYLER, JR.
Attesting Officer                                          Commissioner of Patents